United States Patent Office 3,009,095
Patented Nov. 14, 1961

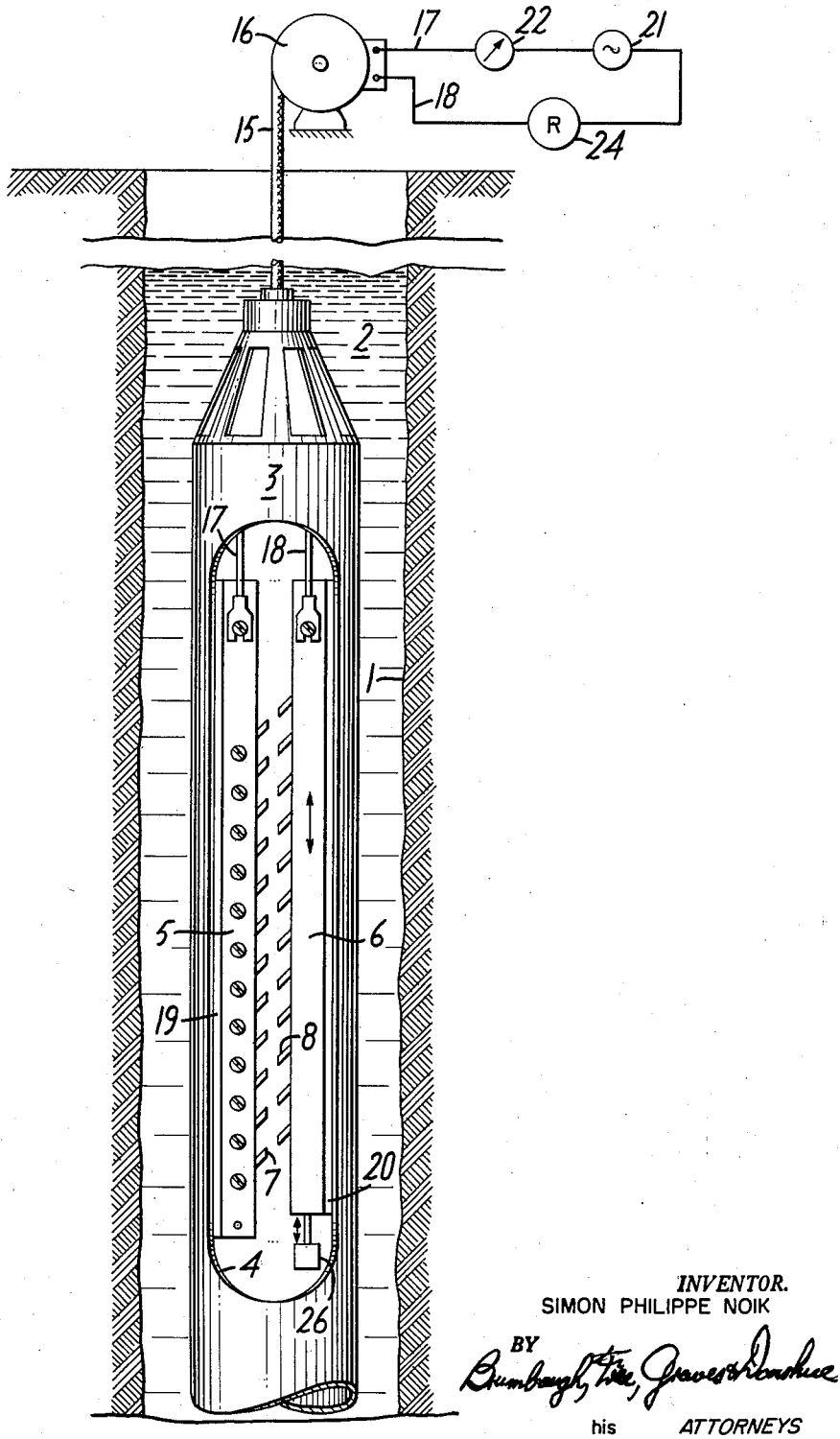

3,009,095
ARRANGEMENT FOR MEASURING THE AMOUNT OF WATER SUSPENDED IN OIL
Simon Philippe Noik, Hericy-sur-Seine, France, assignor to Schlumberger Overseas S.A., Port of Spain, Trinidad, British West Indies, a corporation of Panama
Filed Mar. 2, 1959, Ser. No. 796,402
Claims priority, application France Mar. 14, 1958
5 Claims. (Cl. 324—30)

The problem which consists in measuring the amount of water suspended in oil is frequently met in industrial concerns. Said problem consists more particularly in defining inside oil wells or bore-holes the level and input of water into the oil producing wells. It arises also at different stages of the refining, transportation and storing operations with a view to ascertaining the amount of water contained in suspension in the oil and consequently removing same under the best conditions and checking the grade of the refined product.

It has already been proposed with a view to examining the input of water inside a well to make the oily liquid, of which the water contents are to be measured, pass between two metal comb-shaped members, the teeth of which face each other and which are connected through insulated leads with a supply of voltage in a manner such that the droplets of water contained in the oil and passing between the combs may establish contacts which close a circuit so that it is possible to measure the current passing intermittently through said circuit. Such arrangements have led to some results of a qualitative nature without however allowing a quantitative estimation of the amount of water carried by the oil. Above a small proportion of a few percent, said type of apparatus has a tendency to be permanently short-circuited by droplets of water, the result of which is a mere showing that a large amount of water is permanently present in the oil.

The present invention has for its object to cut out said drawback and to provide an apparatus measuring the amount of water suspended in the oil up to contents reaching 50% in the oil and water mixture, said measuring apparatus defining the proportion of water in oil with a satisfactory accuracy for industrial purposes.

It has also for its object a measurement of the amount of water in oil, not only in the oil-conveying means of the plant at ground level, as is generally provided during the treatment or the refining of such oil, but also inside the actual oil well for the raw oil filling said well.

This result is obtained in accordance with the invention by urging, in a manner similar to that proposed hitherto, the water laden oil between two sufficiently spaced electrodes of a comparatively large size, subjected to a difference in voltage above about 100 volts, which voltage may reach a few hundred volts, so as to produce an electric field leading to electro-static coalescence of the free or emulsified fine droplets which form thus larger-sized drops. Said electrodes carry similar series of teeth, the corresponding teeth on the two electrodes extending towards each other so as to attract toe drops of water and to allow their counting by making an electric current between the teeth engaged by such a drop; the intensity of said current is at a predetermined moment proportional to the number of pairs of teeth electrically connected by a drop of water. Any relative movement between the teeth and the liquid or between the teeth of the two combs shifts the drops of water off the teeth after they have been counted. The voltage applied may be an alternating voltage so as to cut out any rapid damaging of the electrodes and it may be intermittently applied so as to interrupt periodically the series of phenomena described hereinabove and to make the movements of the drops of water easier under the action of the above-mentioned relative movement.

In practice, the frequency of the alternating field used may be of a magnitude of about 10 per second. In the case of operation inside a well with a view to defining the water contents of oil, chiefly for localizing the inputs of water, the whole apparatus may be shifted as a unit inside the liquid and the relative movement of said apparatus with reference to the liquid will then be sufficient for the removal of the water drops immediately after they have been collected by the teeth.

As already mentioned, such an apparatus allows measuring the water contents of the oil for a proportion of water in the mixture ranging approximately between 0 and 50%, i.e. as long as the oil forms the continuous phase of the water and oil mixture. For higher water contents, the water forms generally the continuous phase and consequently the mixture becomes conductive. For this reason, the arrangement described cannot be any longer operative, but it is obvious that for such mixtures it is an easy matter to obtain the water contents by measuring the electric resistivity of said mixture through a resistivity meter. According to the invention, it is therefore sufficient to associate an electric arrangement such as that which has just been described with a resistivity meter whereby the water contents of an oil and water mixture may be ascertained for water proportions in the mixture ranging between 0 and 100%.

In the case where the apparatus is to be used above ground level, it may be arranged in particular inside suitable channels conveying water-containing fluids the progression of which will actually carry along with it the droplets collected by the teeth system. In the case of a liquid contained in a vat, the removal of the droplets may be obtained through a shifting with reference to each other of the two cooperating comb-shaped electrodes.

Further features and objects of the invention will appear in the reading of the following description, reference being made to the accompanying diagrammatic drawing illustrating, by way of example and in a non-limiting sense, a preferred embodiment of the invention. The single figure of said drawing is a diagrammatic side view of an apparatus according to the invention, assumed to be immersed inside a bore-hole or oil well.

As illustrated, the well 1 is filled with a liquid 2 constituted by a suspension of water droplets in oil inside which liquid dips the body 3 of the apparatus, said body being suspended inside the well through the agency of a cable 15 and conventional hoist equipment 16. The cable 15 includes conventional insulated electric leads 17 and 18 adapted to supply the apparatus with electrical energy. The body 3 is provided laterally with elongated openings 4 to permit the flow of the liquid 2 inside the body 3, and inside said body are arranged electrodes 5 and 6 which are suitably insulated with reference to each other by insulating material 19 and 20. Said electrodes are connected with an electric system including a conventional voltage source 21 adapted to produce between them a suitable pulsed difference in potential of a magnitude of 350 volts, for instance. Each of said electrodes carries a series of teeth 7 and 8 sloping say at 45° with reference to said electrodes as illustrated, and leaving between them a spacing of a magnitude of about 0.3 mm. A galvanometer or the like measuring instrument 22 allows measuring at every moment the intensity of the current passing between the electrodes.

Said arrangement operates as follows: the apparatus is first brought into the area to be examined, after which it is raised inside the well through action on the cable 15 at a suitable speed. At the same time, the intensity of the current passing between the electrodes is measured.

As mentioned hereinabove, said intensity is proportional to the number of pairs of teeth interconnected by a drop of water and it depends, consequently, on the amount of water suspended in the oil filling the well at a location registering with the apparatus. The latter is furthermore constantly swept by the oil, as a consequence of the actual movement of said apparatus inside the oil. It is sufficient, under such conditions, to gauge the apparatus, so as to measure with a sufficient accuracy the amount of water contained inside the oil, provided said amount of water does not rise as an average beyond 50%, i.e. as long as the water forms a suspension in the oil instead of the reverse. To obtain a measurement in the case where, on the contrary, the oil is suspended in the water, it is possible to use, as mentioned hereinabove, a resistivity meter 24 of a known type such as a conventional ohmmeter associated and in electrical circuit with the apparatus measure the resistivity of the electrical path between the electrodes 5 and 6, according to the invention.

Obviously, numerous modifications may be brought to the apparatus described without unduly widening the scope of the invention, as defined in the accompanying claims. In particular, as already mentioned, the apparatus according to the invention may serve for measuring the amount of water contained in the oil otherwise than inside an oil well and, in such a case, there should be provided, if required, a movement of the electrodes with reference to the liquid with a view to executing a sort of washing of said electrodes by the liquid and to preventing the drops of water from remaining adherent to said electrodes. Such a result may be obtained by shifting at least one electrode by conventional driving means 26 for producing reciprocal motion, such as shown in U.S. Patent No. 2,812,587, for example, or on the contrary by urging the liquid over said electrodes.

What I claim is:

1. An arrangement for measuring the amount of water in suspension in a mass of oil, chiefly in oil-filled boreholes, comprising two large electrodes arranged in parallelism and adapted to be immersed inside the mass of oil, a plurality of pairs of teeth facing each other with a slight spacing therebetween and carried respectively by the two electrodes and electrically connected therewith, a circuit subjecting said electrodes to a high difference in potential of at least 100 volts, means for producing a relative movement of at least one electrode with reference to the mass of oil, and an instrument for measuring an electric magnitude depending on the intensity of the current flowing across the electrodes upon passage of a large drop of water between two teeth of any pair.

2. An arrangement for measuring the amount of water in suspension in a mass of oil, chiefly in oil-filled boreholes, comprising two large electrodes arranged in parallelism and adapted to be immersed inside the mass of oil, a plurality of pairs of teeth facing each other with a slight spacing of about a few tenths of a mm. therebetween and carried respectively by the two electrodes and electrically connected therewith, a circuit subjecting said electrodes to a high difference in potential of at least 100 volts, means for producing a relative movement of at least one electrode with reference to the mass of oil, and an instrument for measuring an electric magnitude depending on the intensity of the current flowing across the electrodes upon passage of a large drop of water between two teeth of any pair.

3. An arrangement for measuring the amount of water in suspension in a mass of oil, chiefly in oil-filled boreholes, comprising two large electrodes arranged in parallelism and adapted to be immersed inside the mass of oil, a plurality of pairs of teeth facing each other with a slight spacing therebetween and carried respectively by the two electrodes and electrically connected therewith, a circuit subjecting said electrodes to an alternating difference in voltage of at least 100 volts, the frequency of which ranges between a few units and a few tens, means for producing a relative movement of at least one electrode with reference to the mass of oil, and an instrument for measuring an electric magnitude depending on the intensity of the current flowing across the electrodes upon passage of a large drop of water between two teeth of any pair.

4. An arrangement for measuring the amount of water in suspension in a mass of oil, comprising two large electrodes arranged in parallelism and adapted to be immersed inside the mass of oil, a plurality of pairs of teeth facing each other with a slight spacing therebetween and carried respectively by the two electrodes and electrically connected therewith, a circuit subjecting said electrodes to a high difference in potential of at least 100 volts, means for producing a relative movement of said electrodes with reference to each other, and an instrument for measuring an electric magnitude depending on the intensity of the current flowing across the electrodes upon passage of a large drop of water between two teeth of any pair.

5. An apparatus for measuring the amount of water with reference to that of oil in an oil and water mixture, comprising two large electrodes arranged in parallelism and adapted to be immersed inside the mixture, a plurality of pairs of teeth facing each other with a slight spacing therebetween and carried respectively by the two electrodes and electrically connected therewith, a circuit subjecting said electrodes to a high A.C. difference in potential of at least 100 volts, means for producing a relative movement of at least one electrode with reference to the mixture, an instrument for measuring an electric magnitude depending on the intensity of the current flowing across the electrodes upon passage of a large drop of water between two teeth of any pair to provide an indication proportional to the water contents in the mixture when the water is suspended in the oil and a resistivity meter adapted to be immersed inside the mixture and electrically connected with said circuit to provide an indication proportional to the amount of oil in suspension in the water when the oil is suspended in the water.

References Cited in the file of this patent

UNITED STATES PATENTS

| 2,678,911 | Chittum | May 18, 1954 |
| 2,830,945 | Keidel | April 15, 1958 |